(12) United States Patent
Zell

(10) Patent No.: US 10,358,121 B2
(45) Date of Patent: Jul. 23, 2019

(54) LOCKED WHEEL ANNUNCIATION DURING EMERGENCY BRAKING

(71) Applicant: GOODRICH CORPORATION, Charlotte, NC (US)

(72) Inventor: Brian Keith Zell, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/730,584

(22) Filed: Oct. 11, 2017

(65) Prior Publication Data

US 2019/0106092 A1    Apr. 11, 2019

(51) Int. Cl.
| | | |
|---|---|---|
| *B60T 8/88* | (2006.01) | |
| *B60B 39/00* | (2006.01) | |
| *B60T 8/1763* | (2006.01) | |
| *F16H 59/44* | (2006.01) | |
| *B60T 8/32* | (2006.01) | |

(52) U.S. Cl.
CPC .............. *B60T 8/88* (2013.01); *B60T 8/325* (2013.01); *B60T 2240/00* (2013.01); *B60T 2270/402* (2013.01)

(58) Field of Classification Search
CPC .......... B60T 8/88; B60T 8/1703; B60T 8/885; B60T 8/17633; B60T 8/1763; B60G 17/0185; B64D 45/00; B60K 23/08; F16H 59/44; B60B 39/00
See application file for complete search history.

(56) References Cited

U.S. PATENT DOCUMENTS

| | | | | |
|---|---|---|---|---|
| 3,525,553 | A | * | 8/1970 | Carp ................... B60T 8/17633 303/177 |
| 3,702,714 | A | * | 11/1972 | Branson .............. B60T 8/17633 303/126 |
| 3,847,445 | A | | 11/1974 | Bissell |
| 3,880,475 | A | | 4/1975 | Booher |
| 4,006,941 | A | | 2/1977 | Devlieg |
| 4,115,756 | A | | 9/1978 | Dicecio |
| 5,799,748 | A | * | 9/1998 | Origuchi ................ B60K 23/08 180/233 |

(Continued)

FOREIGN PATENT DOCUMENTS

| | | |
|---|---|---|
| CN | 106004833 | 10/2016 |
| CN | 106394880 | 2/2017 |

(Continued)

OTHER PUBLICATIONS

European Patent Office, European Search Report dated Feb. 13, 2019 in Application No. 18199713.1.

*Primary Examiner* — Yuri Kan
(74) *Attorney, Agent, or Firm* — Snell & Wilmer, L.L.P.

(57) ABSTRACT

An emergency braking monitoring system includes a wheel assembly having a first wheel, an emergency braking monitoring unit coupled to the wheel assembly, and a locked wheel annunciation center coupled to the emergency braking monitoring unit for annunciation purposes. The emergency braking monitoring unit generates a fault annunciation signal based on a determination as to whether a first wheel speed value originating from the first wheel of the wheel assembly is a predetermined amount less than a reference value for a persistence time.

20 Claims, 5 Drawing Sheets

(56) References Cited

U.S. PATENT DOCUMENTS

| | | | | |
|---|---|---|---|---|
| 5,896,083 | A * | 4/1999 | Weisman, II | F16H 59/44 |
| | | | | 180/173 |
| 6,711,488 | B2 * | 3/2004 | Zierolf | B60T 8/1703 |
| | | | | 303/121 |
| 6,882,920 | B2 * | 4/2005 | Rudd, III | B60T 8/1703 |
| | | | | 303/155 |
| 9,227,608 | B2 * | 1/2016 | Hill | B60T 8/1703 |
| 9,981,754 | B2 * | 5/2018 | Georgin | B64D 45/00 |
| 2017/0274721 | A1 * | 9/2017 | Kasuga | B60G 17/016 |
| 2017/0274722 | A1 * | 9/2017 | Kasuga | B60G 17/016 |

FOREIGN PATENT DOCUMENTS

| | | | | |
|---|---|---|---|---|
| CN | 106394881 | | 2/2017 | |
| DE | 2739468 | | 3/1978 | |
| GB | 1262021 | A * | 2/1972 | B60T 8/1703 |
| WO | 0023305 | | 4/2000 | |

\* cited by examiner

LOCKED WHEEL ANNUNCIATION DURING EMERGENCY BRAKING

FIELD OF THE DISCLOSURE

The present disclosure relates to aircraft emergency braking monitoring systems.

In particular, the disclosure relates to systems and methods for locked wheel annunciation during emergency braking.

BACKGROUND OF THE DISCLOSURE

During normal, non-emergency braking conditions of an aircraft, a typical function of the brake control system is to monitor the wheels of the aircraft for a locked condition. The locked condition may be determined by assessing whether there has been a reduction in rotational wheel speed on any particular wheel as compared to any of the other wheels or combination thereof on the aircraft. The mitigation for this condition provided by the brake control system may be described as locked wheel protection. The locked wheel condition may be provided as a fault message as part of the aircraft diagnostic capabilities. In an emergency braking situation, however, the conditions used to enable locked wheel protection for normal braking situations may not be met or desirable.

SUMMARY OF THE DISCLOSURE

In various embodiments, an emergency braking monitoring system includes a wheel assembly having a first wheel, an emergency braking monitoring unit coupled to the wheel assembly, and a locked wheel annunciation center coupled to the emergency braking monitoring unit for annunciation purposes, wherein the emergency braking monitoring unit generates a fault annunciation signal based on a determination as to whether a first wheel speed value originating from the first wheel of the wheel assembly is a predetermined amount less than a reference value for a persistence time.

In various embodiments of the emergency braking monitoring system, the reference value is at least one of a second wheel speed value, a third wheel speed value, a fourth wheel speed value, and an aircraft speed.

In various embodiments of the emergency braking monitoring system, the persistence time is a duration of time for which a fault occurs.

In various embodiments of the emergency braking monitoring system, the fault annunciation signal is provided to the locked wheel annunciation center coupled to the emergency braking monitoring unit.

In various embodiments of the emergency braking monitoring system, the locked wheel annunciation center makes an annunciation based on the fault annunciation signal.

In various embodiments of the emergency braking monitoring system, the annunciation includes at least one of a notice that a skid is likely to occur, a locked-wheel is likely to occur, a tire blowout is likely to occur, the predetermined amount, and the persistence time.

In various embodiments of the emergency braking monitoring system, the annunciation occurs during a manual emergency braking event.

In various embodiments of the emergency braking monitoring system, at least one of the persistence time and the predetermined amount is retrieved from at least one of a lookup-table, database, and flat-file.

In various embodiments of the emergency braking monitoring system, the wheel assembly includes a first wheel speed monitor coupled to the first wheel to ascertain the first wheel speed value.

In various embodiments of the emergency braking monitoring system, the wheel assembly includes a second wheel speed monitor coupled to a second wheel to ascertain the second wheel speed value, a third wheel speed monitor coupled to a third wheel to ascertain the third wheel speed value, and a fourth wheel speed monitor coupled to a fourth wheel to ascertain the fourth wheel speed value.

In various embodiments, an emergency braking monitoring system includes a first wheel speed monitor coupled to a first wheel to ascertain a first wheel speed value, a second wheel speed monitor coupled to a second wheel to ascertain a second wheel speed value, an emergency braking monitoring unit coupled to the first wheel speed monitor and the second wheel speed monitor, wherein the emergency braking monitoring unit makes a determination as to whether a speed differential between the first wheel speed value and the second wheel speed value or an aircraft speed exceeds or is equal to a threshold value for a persistence time and generates an annunciation based on the determination.

In various embodiments of the emergency braking monitoring system, the persistence time is a duration of time for which a fault occurs.

In various embodiments of the emergency braking monitoring system, the annunciation is provided by a locked wheel annunciation center.

In various embodiments of the emergency braking monitoring system, the annunciation includes at least one of a notice that a skid is likely to occur, a locked-wheel is likely to occur, a tire blowout is likely to occur, the threshold value, and the persistence time.

In various embodiments of the emergency braking monitoring system, the threshold value is retrieved from at least one of a lookup-table, database, or flat-file.

In various embodiments of the emergency braking monitoring system, the annunciation occurs during a manual emergency braking.

In various embodiments, a method of annunciating during an emergency braking includes retrieving, by an emergency braking monitoring unit, a persistence time and a predetermined amount, ascertaining, by the emergency braking monitoring unit, a first wheel speed value of a first wheel using a first wheel speed monitor, ascertaining, by the emergency braking monitoring unit, a reference value that is at least one of a second wheel speed value of a second wheel using a second wheel speed monitor or an aircraft speed, determining, by the emergency braking monitoring unit, whether the first wheel speed value is the predetermined amount less than the reference value for the persistence time, and providing, by the emergency braking monitoring unit, an annunciation based on the determining whether the first wheel speed value is the predetermined amount less than the reference value for the persistence time.

In various embodiments of the method, the annunciation provides feedback via a locked wheel annunciation center to determine whether an amount of braking requested exceeds a brake threshold.

In various embodiments of the method, the annunciation provides a notification to reduce the amount of emergency braking applied to at least one of the first wheel, the second wheel, a third wheel, and a fourth wheel.

In various embodiments of the method, the annunciation includes at least one of a notice that a skid is likely to occur, a notice that a tire blowout is likely to occur, the predetermined amount, and the persistence time.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, systems and methods may find particular use in connection with aircraft antiskid braking systems. However, various aspects of the disclosed embodiments may be adapted for optimized performance with a variety of applications implementing brake control systems and/or pressure and/or force controllers. As such, numerous applications of the present disclosure may be realized.

Figure 1:
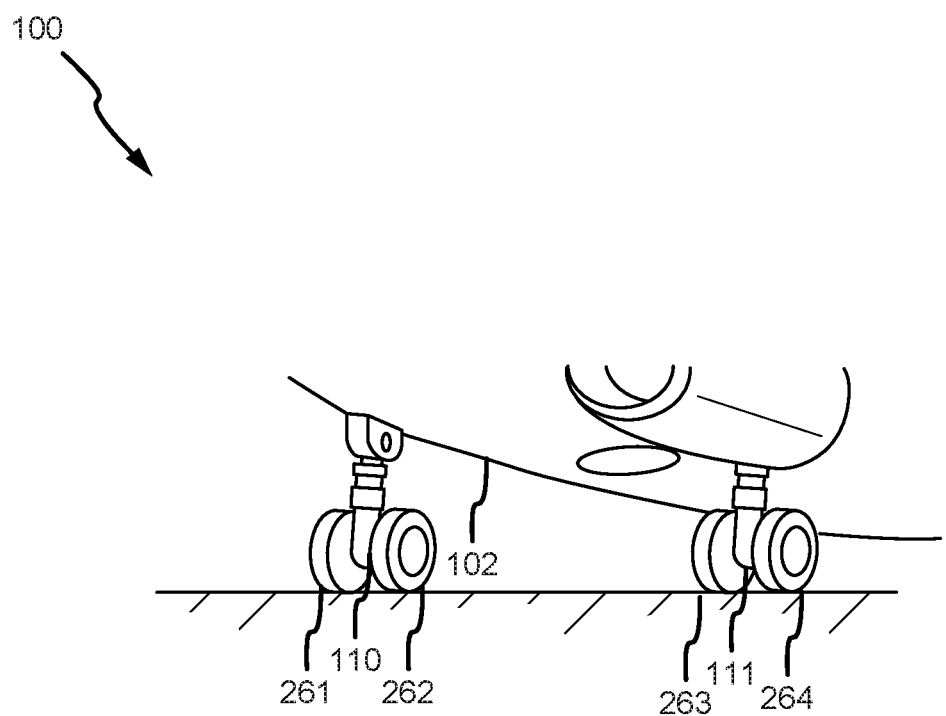
FIG. 1 illustrates a perspective view of a four wheel aircraft configuration in accordance with various embodiments.

FIG. 1 depicts a four wheel aircraft configuration 100 according to various embodiments. Four wheel aircraft configuration 100 includes an aircraft 102, a first wheel 261, a second wheel 262, a third wheel 263, a fourth wheel 264, a brake system 110, and a brake system 111. Brake system 110 is coupled to first wheel 261 and a second wheel 262. Brake system 111 is coupled to third wheel 263 and fourth wheel 264. Emergency braking monitoring system 200 (referring momentarily to FIG. 2) allows an annunciation to be provided to, for example, the pilot of aircraft 102 and/or brake control unit 254 to allow the pilot or aircraft to adjust the speed of the wheels to prevent skidding of aircraft 102.

In various embodiments, during normal operation of aircraft 102, anti-skid technology may be implemented using brake control unit 254 to prevent aircraft 102 from skidding. However, during emergency braking of aircraft 102, brake control unit 254 may be bypassed and fed directly into, for example, a servovalve for hydraulic brakes or an electro-mechanical brake actuator controller (EMAC) for electric brakes. Brake control unit 254 may be bypassed utilizing, for example, an emergency braking handle or an emergency braking button located inside aircraft 102.

As a result of brake control unit 254 being bypassed during emergency braking, the anti-skid functionality normally provided by brake control unit 254 may be disabled and/or unable to perform normal anti-skidding operations. Without utilizing emergency braking monitoring unit 234, such an occurrence would likely lead to the pilot of aircraft 102 not having access to anti-skid functionality and cause an increase in the risk of aircraft skidding and/or rapid tire deflation ("blow out"). Emergency braking monitoring unit 234, however, may be able to perform, for example, anti-skid calculations which may then be provided to pilot of aircraft 102.

Figure 2:
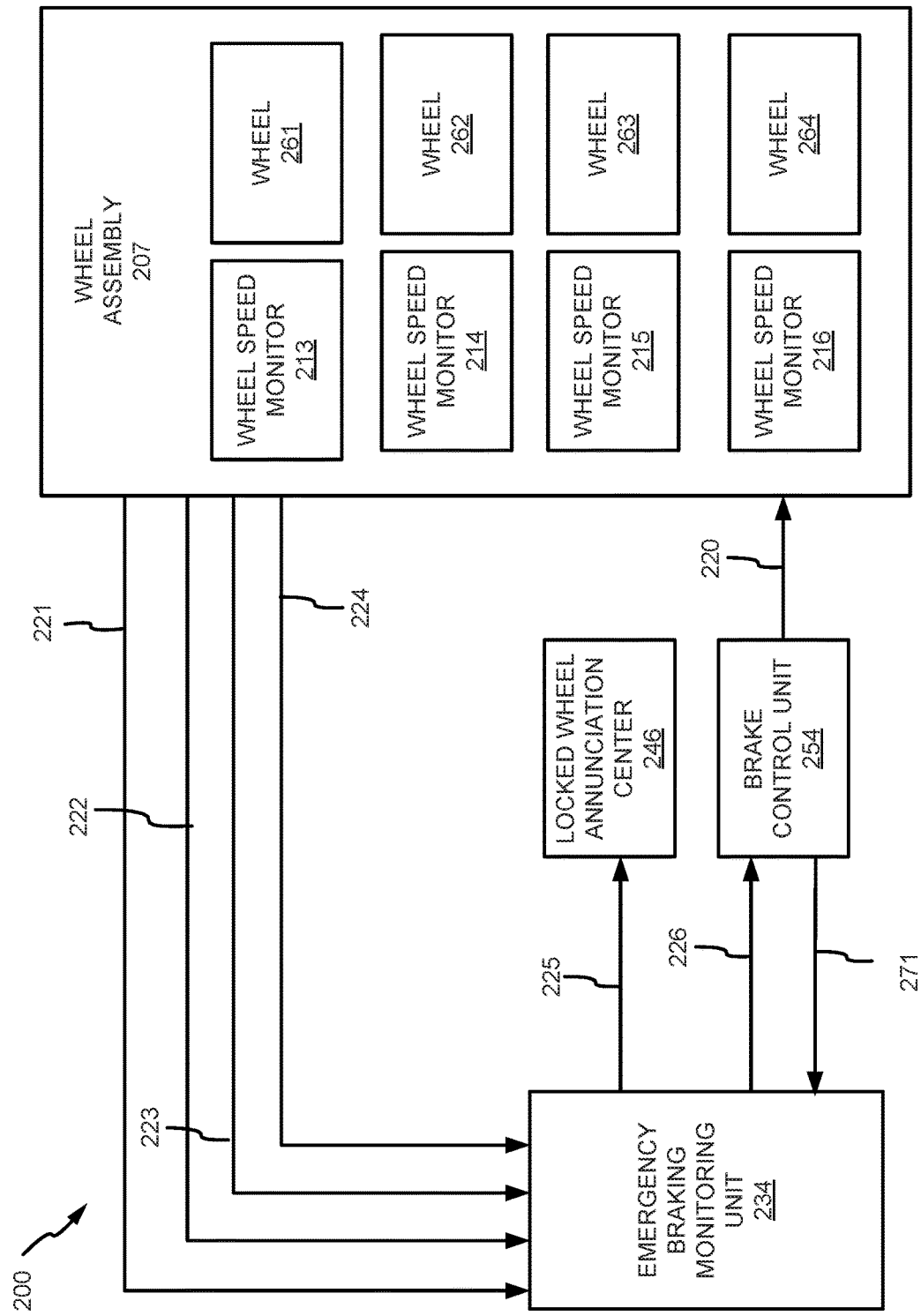
FIG. 2 is a block diagram showing an emergency braking monitoring system in accordance with various embodiments.

FIG. 2 depicts an emergency braking monitoring system 200 according to various embodiments. Emergency braking monitoring system 200 includes a wheel assembly 207, an emergency braking monitoring unit 234, a locked wheel annunciation center 246, and a brake control unit 254. In various embodiments, wheel assembly 207 is coupled to emergency braking monitoring unit 234, emergency braking monitoring unit 234 is coupled to locked wheel annunciation center 246 and/or brake control unit 254, and brake control unit 254 is coupled to wheel assembly 207. Emergency braking monitoring unit 234, locked wheel annunciation center 246, and brake control unit 254 may include one or more processors and one or more tangible, non-transitory memories and be capable of storing instructions. The processor/s may be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, wheel assembly 207 includes a first wheel speed monitor 213, a second wheel speed monitor 214, a third wheel speed monitor 215, a fourth wheel speed monitor 216, a first wheel 261, a second wheel 262, a third wheel 263, and a fourth wheel 264. In various embodiments, first wheel speed monitor 213 may be a speed monitor that monitors the speed of a left outboard wheel (WLOB). Second wheel speed monitor 214 may be a speed monitor that monitors the speed of a left in board wheel (WLIB). Third wheel speed monitor 215 may be a speed monitor that monitors the speed of a right inboard wheel (WRIB). Fourth wheel speed monitor 216 may be a speed monitor that monitors the speed of a right outboard wheel (WROB). First wheel speed monitor 213, second wheel speed monitor 214, third wheel speed monitor 215, and fourth wheel speed monitor 216 may be, for example, any type of velocity sensor capable of sensing the angular velocity of first wheel 261, second wheel 262, third wheel 263, and fourth wheel 264, respectively.

In various embodiments, first wheel speed monitor 213 is coupled to first wheel 261 to ascertain the speed (i.e., first wheel speed value 221) of first wheel 261. Second wheel speed monitor 214 is coupled to second wheel 262 to ascertain the speed (i.e., second wheel speed value 222) of second wheel 262. Third wheel speed monitor 215 is coupled to third wheel 263 to ascertain the speed (i.e., third wheel speed value 223) of third wheel 263. Fourth wheel speed monitor 216 is coupled to fourth wheel 264 to ascertain the speed (i.e., fourth wheel speed value 224) of fourth wheel 264.

In various embodiments, during operation of emergency braking monitoring system 200, wheel assembly 207 provides first wheel speed value 221, second wheel speed value 222, third wheel speed value 223, and fourth wheel speed value 224 to emergency braking monitoring unit 234. In various embodiments, a monitoring circuit located in, for example, emergency braking monitoring unit 234 receives first wheel speed value 221, second wheel speed value 222, third wheel speed value 223, and/or fourth wheel speed value 224 from wheel assembly 207 and determines if a selected at least one of the first wheel speed value 221, second wheel speed value 222, third wheel speed value 223, and/or fourth wheel speed value 224 is a predetermined amount less than a reference value. The reference value may be defined as, for example, other non-selected wheel speed values and/or the ground speed of aircraft 102. The reference value may derive from, for example, aircraft avionics. The structure of the monitoring circuit may include, for example, integrated circuit components and the like capable of performing logic and memory operations necessary to perform the operations described herein.

The predetermined amount or threshold value may be defined as a speed difference between a first wheel and a reference value (e.g., second wheel and/or aircraft speed) that is likely to cause aircraft 102 to skid and may be determined by depending on a variety of factors. The predetermined amount may be, for example, 5%+−3%, 10%+−4%, 15%+−5%, 20%+−6% of a selected wheel speed value or reference value and may be any other percentage or value determined to be appropriate to reduce and/or prevent skidding or rapid tire deflation of aircraft 102. In various embodiments, the predetermined amount may be stored in a memory location and may be retrieved from at least one of a lookup-table, database, or flat-file located in, for example, emergency braking monitoring unit 234.

In various embodiments, emergency braking monitoring unit 234 determines whether the threshold value is exceeded for a persistence time. Persistence time may be defined as the time in which a fault occurs. Persistence time may be, for example, the time in which a fault occurs prior to making a fault annunciation and may be determined by designer's preferences. For example, the persistence time may be between 100 milliseconds and 200 milliseconds or any other range of time deemed appropriate to annunciate that skidding of the aircraft may occur. For example, a persistence time may be set for 100 milliseconds. Thus, if an assessment is made by emergency braking monitoring unit 234 that first wheel 261 is slower than a second wheel 262 for at least 100 milliseconds, a decision may be made to annunciate that, for example, a skid is likely to occur. In various embodiments, the persistence time may be stored in a memory location and may be retrieved from at least one of a lookup-table, database, or flat-file located in, for example, emergency braking monitoring unit 234.

In various embodiments, when the selected wheel speed value is a predetermined amount less than other non-selected wheel speed values or other reference value for the specified persistence time, a fault annunciation signal 225 may be provided to locked wheel annunciation center 246. Fault annunciation signal 225 may, for example, provide locked wheel annunciation center 246 with the requisite threshold and persistence time.

Locked wheel annunciation center 246 receives the fault annunciation signal 225 and may annunciate the requisite threshold, the persistence time, and/or a notice that at least one wheel speed is sufficiently distinct from the other wheel speeds, and/or does not meet an expected velocity magnitude. The fault annunciation may occur during manual emergency braking and may provide feedback to, for example, a pilot of aircraft 201 to determine whether the amount of braking requested is excessive. The annunciation may provide the pilot with feedback to decide whether to reduce the amount of emergency braking applied to possibly eliminate or reduce the potential to blowout and/or lock first wheel 261, second wheel 262, third wheel 263, and/or fourth wheel 264 due to excessive skidding. For example, locked wheel annunciation center 246 may annunciate that a skid is likely to occur, a locked-wheel is likely to occur, and/or a tire blowout is likely to occur. In addition, locked wheel annunciation center 246 may annunciate the predetermined amount and/or persistence time.

In various embodiments, emergency braking monitoring unit 234 may also provide a brake notification signal 226 containing the requisite threshold and persistence time to brake control unit 254. The brake notification signal 226 may allow brake control unit 254 to provide an adjustment signal 220 to wheel assembly 207 to allow wheel assembly 207 to adjust the speed of first wheel 261, second wheel 262, third wheel 263, further fourth wheel 264, accordingly.

In various embodiments, emergency braking monitoring unit 234 may compare first wheel speed value 221 to second wheel speed value 222 and determine a first speed differential (i.e., the difference between first wheel speed value 221 and second wheel speed value 222). Emergency braking monitoring unit 234 may compare the first speed differential to a threshold value and determine whether the first speed differential is greater than, less than, or equal to the threshold value for a persistence time. If the first speed differential is greater than or equal to the threshold value for the persistence time, fault annunciation signal 225 may be provided to locked wheel annunciation center 246 to annunciate the requisite threshold and persistence time to the pilot of aircraft 102.

In various embodiments, for example, if the first wheel speed value 221 is 200 mph (322 kph) and the second wheel speed value 222 is 212 mph (341 kph), then the first speed differential is 12 mph (19 kph). If the threshold value is 10 mph (16 kpg), then first speed differential exceeds the threshold value by 2 mph (3 kph). If the persistence time is 200 milliseconds and the first speed differential is greater than the threshold value for more than the persistence time of 200 milliseconds, then a fault annunciation signal 225 may be sent to locked wheel annunciation center 246 for annunciation to the pilot. The pilot may then use the annunciation to prevent skidding of aircraft 102 or to reduce the amount of emergency braking to apply to possibly eliminate or reduce the potential to blowout first wheel 261, second wheel 262, third wheel 263, and/or fourth wheel 264.

In various embodiments, with further reference to FIG. 2, emergency braking monitoring unit 234 may receive a braking information signal 271 from brake control unit 254. Braking information signal 271 may contain, for example, information about the amount of brake applied by the pilot or brake control unit 254 to first wheel 261, second wheel 262, third wheel 263, and/or fourth wheel 264. Emergency braking monitoring unit 234 may determine if the amount of braking applied corresponding to a persistence time and/or a speed differential of a first wheel 261 and a reference value exceeds a brake threshold likely to blowout first wheel 261, second wheel 262, third wheel 263, and/or fourth wheel 264. The brake threshold may be, for example, any amount of brake pressure deemed appropriate to prevent tire blowout for the prescribed speed differential and/or persistence time. If the brake amount exceeds the brake threshold for the prescribed speed differential and/or persistence time, locked wheel annunciation center 246 annunciates a notification to reduce the amount of emergency braking applied to eliminate or reduce the potential to blowout and/or lock first wheel 261, second wheel 262, third wheel 263, and/or fourth wheel 264.

Figure 3:
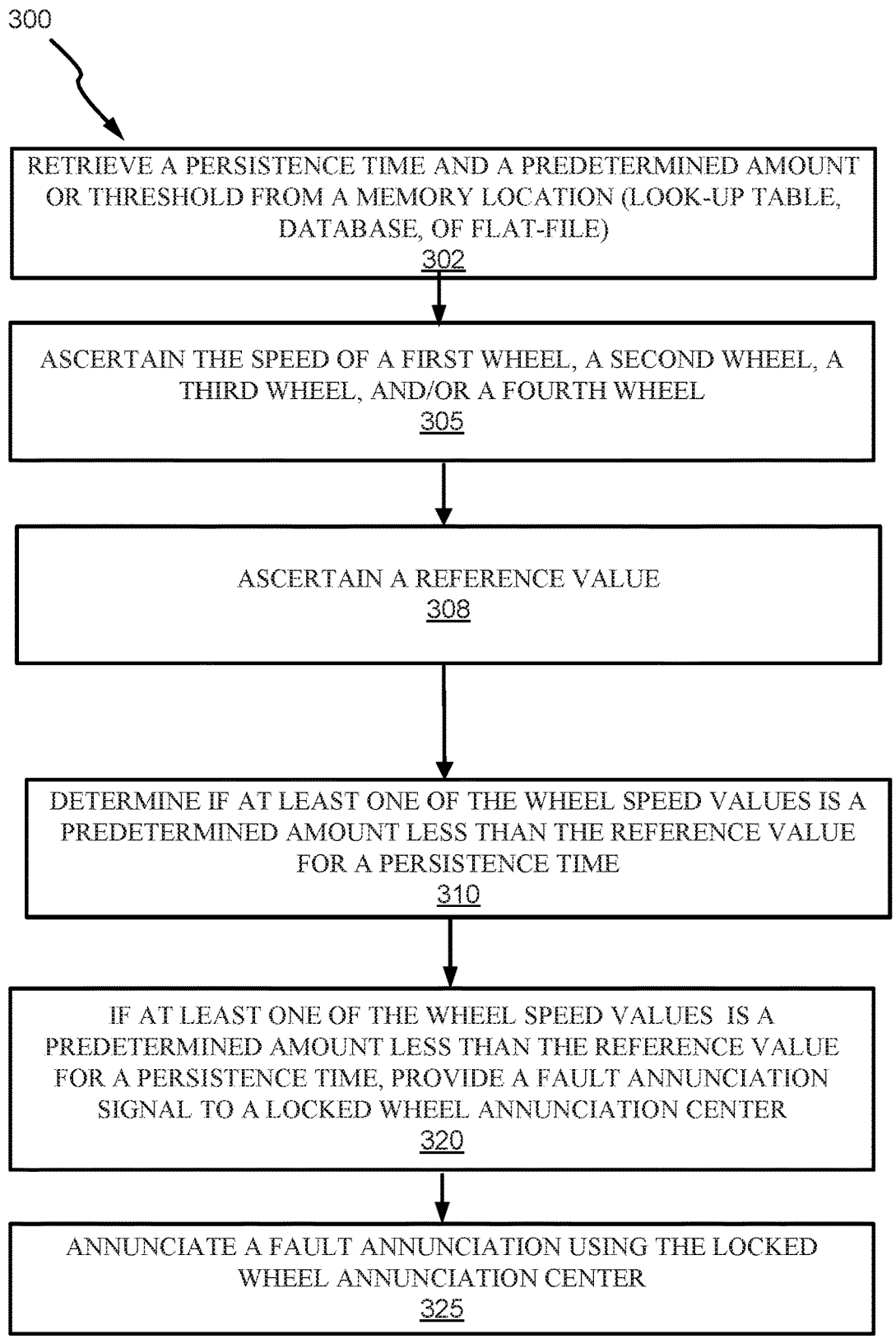
FIG. 3 is a diagram illustrating a process flow for an emergency braking monitoring system in accordance with various embodiments.

FIG. 3 is a diagram illustrating a process flow 300 for emergency braking monitoring system 200 in accordance with various embodiments. Occasional reference may also be made to components shown in FIG. 1 and/or FIG. 2. In step 302, a persistence time and a predetermined time or threshold value is retrieved from a memory location (e.g., look-up table, database, or flat-file) by the emergency braking monitoring unit 234. In step 305, the speed of first wheel 261, second wheel 262, third wheel 263, and/or fourth wheel 264 is ascertained by the emergency braking monitoring unit 234. In step 308, a reference value (as described previously) is ascertained by emergency braking monitoring unit 234. In step 310, emergency braking monitoring unit 234 determines if at least one of the wheel speed values is a predetermined amount less than the reference value for a persistence time. In step 320, if at least one of ascertained wheel speed values is a predetermined amount less than the reference value for a persistence time, a fault annunciation signal is provided to locked wheel annunciation center 246. In step 325, a fault annunciation is annunciated to, for example, a pilot, using locked wheel annunciation center 246.

Figure 4:
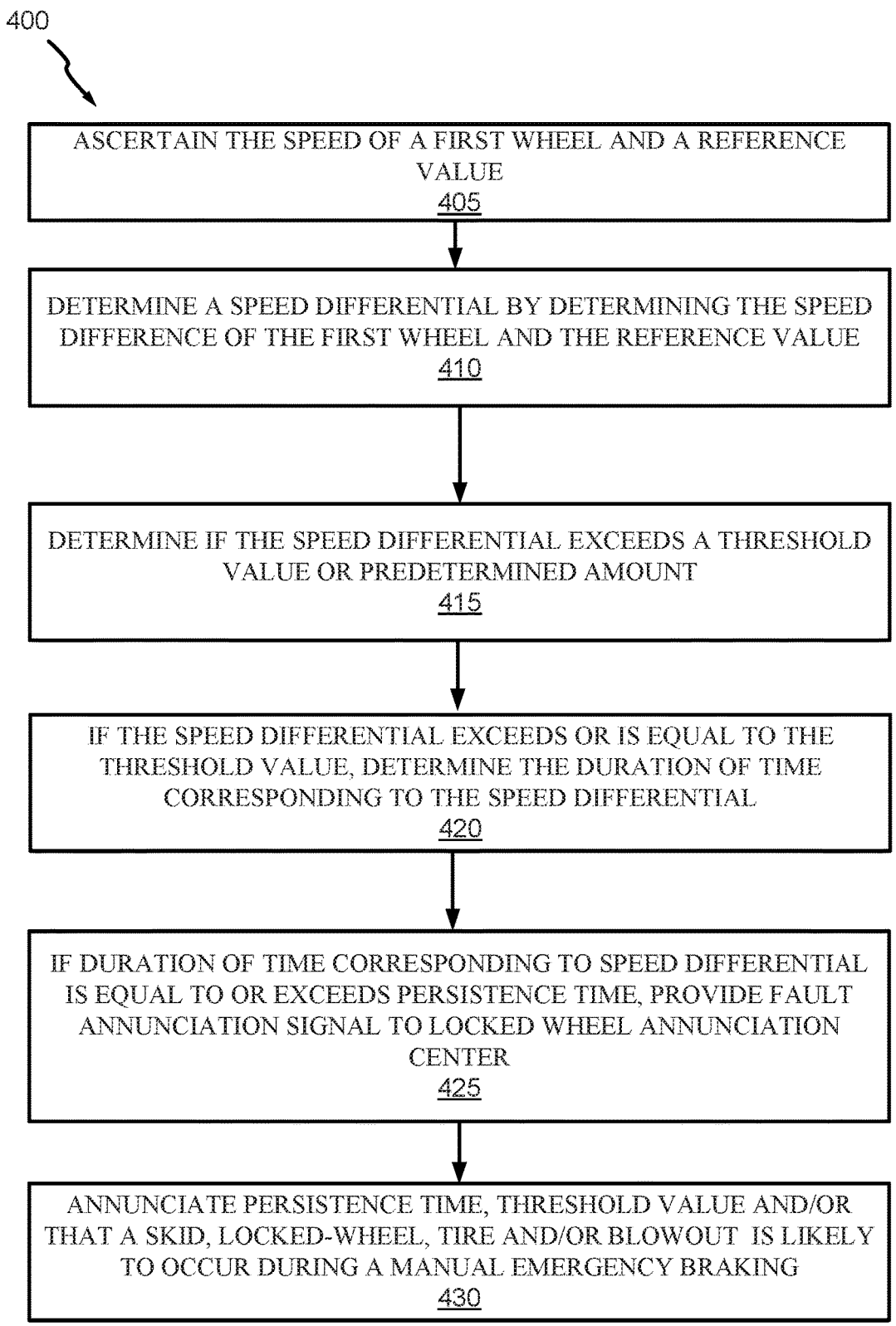
FIG. 4 is a diagram illustrating a process flow for an emergency braking monitoring system in accordance with various embodiments.

FIG. 4 is a diagram illustrating a process flow 400 for emergency braking monitoring system 200 in accordance with various embodiments. Occasional reference may also be made to components shown in FIG. 1 and/or FIG. 2. In step 405, the speed of first wheel 261 and a reference value is ascertained by emergency braking monitoring unit 234. In step 410, emergency braking monitoring unit 234 determines a speed differential by determining the speed difference of first wheel 261 and the reference value. In step 415, emergency braking monitoring unit 234 determines if the speed differential exceeds a threshold value or predetermined amount. In step 420, if the speed differential exceeds or is equal to the threshold value, emergency braking monitoring unit 234 determines the duration of time corresponding to the speed differential. In step 425, if the duration of time corresponding to the speed differential is equal to or exceeds a persistence time, a fault annunciation signal 225 is provided to locked wheel annunciation center 246. In step 430, locked wheel annunciation center 246 annunciates the persistence time, threshold value, and/or a notice that a skid is likely to occur, during, for example, a manual emergency braking event.

Figure 5:
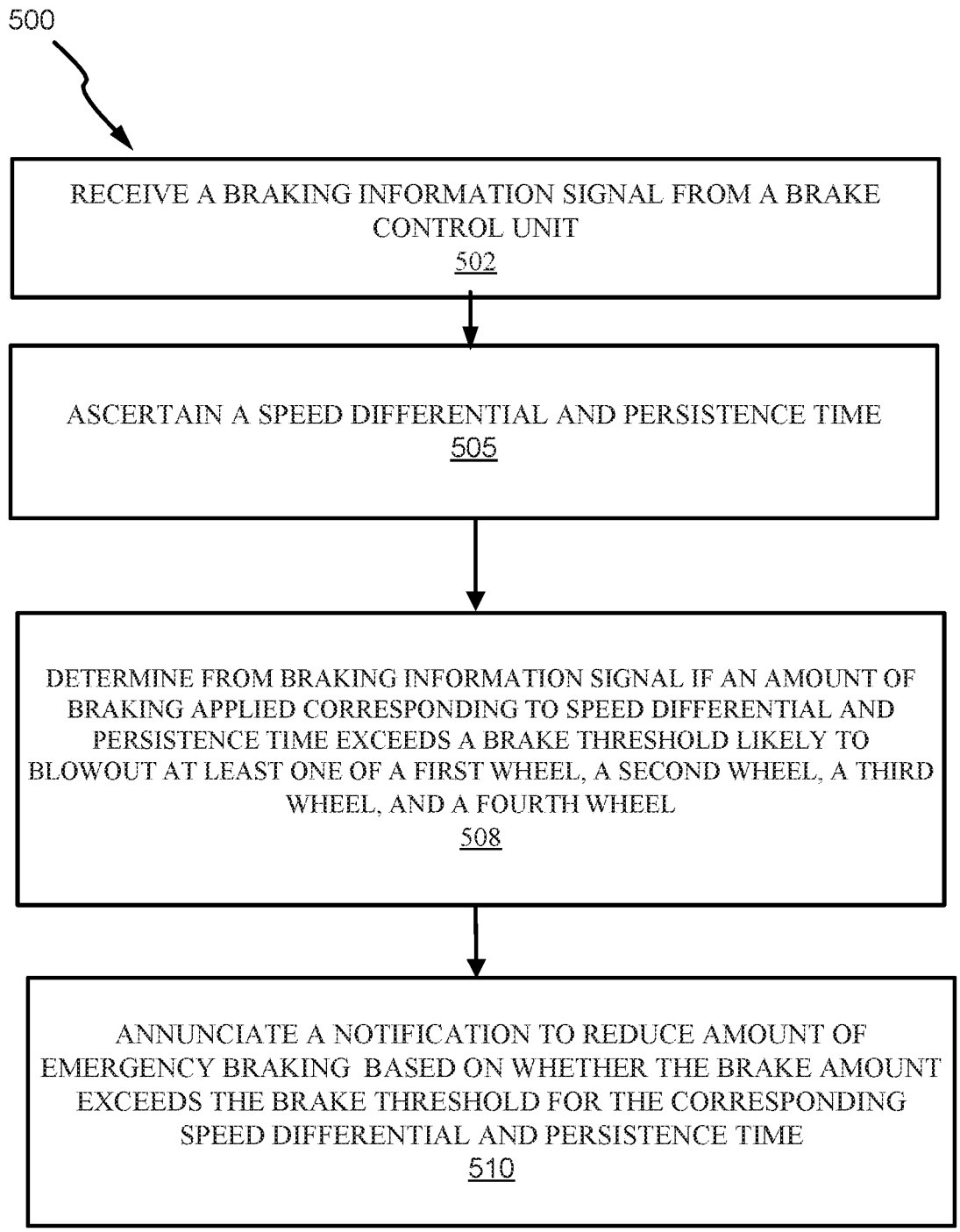
FIG. 5 is a diagram illustrating a process flow for an emergency braking monitoring system in accordance with various embodiments.

FIG. 5 is a diagram illustrating a process flow 500 for emergency braking monitoring system 200 in accordance with various embodiments. Occasional reference may also be made to components shown in FIG. 1 and/or FIG. 2. In various embodiments, in step 502, emergency braking monitoring unit 234 may receive a braking information signal 271 from brake control unit 254. In step 505, a persistence time and a speed differential corresponding to a first wheel 261 and a reference value is ascertained by the emergency braking monitoring unit 234. In step 508, emergency braking monitoring unit 234 may determine if the amount of braking applied for the speed differential and/or persistence time exceeds a brake threshold likely to blowout first wheel 261, second wheel 262, third wheel 263, and/or fourth wheel 264. In step 510, if the brake amount exceeds the brake threshold for the speed differential and/or persistence time, locked wheel annunciation center 246 annunciates a notification to reduce the amount of emergency braking applied to eliminate or reduce the potential to blowout to first wheel 261, second wheel 262, third wheel 263, and/or fourth wheel 264. In various embodiments, the annunciation provides feedback via locked wheel annunciation center 246 that allows a determination to be made as to whether an amount of braking requested by, for example, a pilot, is excessive.

Those of ordinary skill in the art will appreciate that these components and others, are presented herein for explanation. Variations may be made among the components, configurations, and linkages without departing from the scope of this disclosure. Along similar lines, the systems and methods described herein may be applied to any suitable number of wheels (e.g., one or more wheels) and/or any vehicle having wheels.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35

U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An emergency braking monitoring system, comprising:
a wheel assembly having a first wheel;
an emergency braking monitoring unit coupled to said wheel assembly; and
a locked wheel annunciation center coupled to said emergency braking monitoring unit for annunciation purposes, wherein said emergency braking monitoring unit generates a fault annunciation signal based on a determination as to whether a first wheel speed value originating from said first wheel of said wheel assembly is a predetermined amount less than a reference value for a persistence time.

2. The emergency braking monitoring system of claim 1, wherein said reference value is at least one of a second wheel speed value, a third wheel speed value, a fourth wheel speed value, and an aircraft speed.

3. The emergency braking monitoring system of claim 1, wherein said persistence time is a duration of time for which a fault occurs.

4. The emergency braking monitoring system of claim 1, wherein said fault annunciation signal is provided to said locked wheel annunciation center coupled to said emergency braking monitoring unit.

5. The emergency braking monitoring system of claim 4, wherein said locked wheel annunciation center makes an annunciation based on said fault annunciation signal.

6. The emergency braking monitoring system of claim 5, wherein said annunciation includes at least one of a notice that a skid is likely to occur, a locked-wheel is likely to occur, a tire blowout is likely to occur, said predetermined amount, and said persistence time.

7. The emergency braking monitoring system of claim 5, wherein said annunciation occurs during a manual emergency braking event.

8. The emergency braking monitoring system of claim 1, wherein at least one of said persistence time and said predetermined amount is retrieved from at least one of a lookup-table, database, and flat-file.

9. The emergency braking monitoring system of claim 2, wherein said wheel assembly includes a first wheel speed monitor coupled to said first wheel to ascertain said first wheel speed value.

10. The emergency braking monitoring system of claim 9, wherein said wheel assembly includes a second wheel speed monitor coupled to a second wheel to ascertain said second wheel speed value, a third wheel speed monitor coupled to a third wheel to ascertain said third wheel speed value, and a fourth wheel speed monitor coupled to a fourth wheel to ascertain said fourth wheel speed value.

11. An emergency braking monitoring system, comprising:
a first wheel speed monitor coupled to a first wheel to ascertain a first wheel speed value;
a second wheel speed monitor coupled to a second wheel to ascertain a second wheel speed value;
an emergency braking monitoring unit coupled to said first wheel speed monitor and said second wheel speed monitor, wherein said emergency braking monitoring unit makes a determination as to whether a speed differential between said first wheel speed value and said second wheel speed value or an aircraft speed exceeds or is equal to a threshold value for a persistence time and generates an annunciation based on said determination.

12. The emergency braking monitoring system of claim 11, wherein said persistence time is a duration of time for which a fault occurs.

13. The emergency braking monitoring system of claim 11, wherein said annunciation is provided by a locked wheel annunciation center.

14. The emergency braking monitoring system of claim 11, wherein said annunciation includes at least one of a notice that a skid is likely to occur, a locked-wheel is likely to occur, a tire blowout is likely to occur, said threshold value, and said persistence time.

15. The emergency braking monitoring system of claim 11, wherein said threshold value is retrieved from at least one of a lookup-table, database, or flat-file.

16. The emergency braking monitoring system of claim 11, wherein said annunciation occurs during a manual emergency braking.

17. A method of annunciating during an emergency braking, comprising:
retrieving, by an emergency braking monitoring unit, a persistence time and a predetermined amount;
ascertaining, by said emergency braking monitoring unit, a first wheel speed value of a first wheel using a first wheel speed monitor;
ascertaining, by said emergency braking monitoring unit, a reference value that is at least one of a second wheel speed value of a second wheel using a second wheel speed monitor or an aircraft speed;
determining, by said emergency braking monitoring unit, whether said first wheel speed value is said predetermined amount less than said reference value for said persistence time; and
providing, by said emergency braking monitoring unit, an annunciation based on said determining whether said first wheel speed value is said predetermined amount less than said reference value for said persistence time.

18. The method of claim 17, wherein said annunciation provides feedback via a locked wheel annunciation center to determine whether an amount of braking requested exceeds a brake threshold.

19. The method of claim 18, wherein said annunciation, during a manual emergency braking event, provides a notification to reduce an amount of emergency braking applied to at least one of said first wheel, said second wheel, a third wheel, and a fourth wheel.

20. The method of claim 17, wherein said annunciation includes at least one of a notice that a skid is likely to occur, a notice that a tire blowout is likely to occur, said predetermined amount, and said persistence time.

* * * * *